(12) United States Patent
Everett et al.

(10) Patent No.: US 10,268,927 B2
(45) Date of Patent: Apr. 23, 2019

(54) SYSTEM, APPARATUS AND METHOD FOR CONFIGURATION OF INDUSTRIAL VISION CONTROL MODULES

(71) Applicant: EIGEN INNOVATIONS INC., Fredericton (CA)

(72) Inventors: Scott Everett, Fredericton (CA); Richard Jones, Quispamsis (CA)

(73) Assignee: EIGEN INNOVATIONS INC., Fredericton (CA)

( * ) Notice: Subject to any disclaimer, the term of this patent is extended or adjusted under 35 U.S.C. 154(b) by 9 days.

(21) Appl. No.: 15/518,963

(22) PCT Filed: Oct. 14, 2015

(86) PCT No.: PCT/IB2015/057882
§ 371 (c)(1),
(2) Date: Apr. 13, 2017

(87) PCT Pub. No.: WO2016/059576
PCT Pub. Date: Apr. 21, 2016

(65) Prior Publication Data
US 2017/0236035 A1 Aug. 17, 2017

Related U.S. Application Data

(60) Provisional application No. 62/063,555, filed on Oct. 14, 2014.

(51) Int. Cl.
*G06K 9/62* (2006.01)
*G06T 7/00* (2017.01)
(Continued)

(52) U.S. Cl.
CPC ............. *G06K 9/628* (2013.01); *G06F 17/30* (2013.01); *G06K 9/00624* (2013.01);
(Continued)

(58) Field of Classification Search
CPC .... G06K 9/628; G06K 9/6262; G06K 9/6272; G06T 7/001
See application file for complete search history.

(56) References Cited

U.S. PATENT DOCUMENTS 6,610,953 B1 8/2003 Tao et al.
6,705,992 B2 3/2004 Gatzke
(Continued)

FOREIGN PATENT DOCUMENTS

CN 101184167 A 5/2008
WO WO-2012054339 A1 4/2012

OTHER PUBLICATIONS

International Search Report dated Dec. 15, 2015 for International Patent Application No. PCT/IB2015/057882.
(Continued)

*Primary Examiner* — David F Dunphy
(74) *Attorney, Agent, or Firm* — Perry + Currier Inc.

(57) ABSTRACT

A server for configuring an industrial vision control module includes: a memory; a network interface; and a processor interconnected with the memory and the network interface, the processor configured to: receive, via the network interface, image data from a vision system; determine at least one attribute of the image data; store at least one label in association with the at least one attribute; and transmit the at least one attribute and the at least one label to the vision system.

13 Claims, 8 Drawing Sheets

(51) Int. Cl.
    *G06F 17/30*     (2006.01)
    *G08C 25/00*     (2006.01)
    *H04N 7/18*     (2006.01)
    *G06K 9/00*     (2006.01)
    *H04N 21/84*     (2011.01)
    *H04N 21/6587*     (2011.01)

(52) U.S. Cl.
    CPC ......... *G06K 9/6262* (2013.01); *G06K 9/6272* (2013.01); *G06T 7/001* (2013.01); *G08C 25/00* (2013.01); *H04N 7/181* (2013.01); *G06T 2207/10048* (2013.01); *G06T 2207/20081* (2013.01); *H04N 21/6587* (2013.01); *H04N 21/84* (2013.01)

(56) References Cited

U.S. PATENT DOCUMENTS 7,120,644 B1     10/2006     Canessa et al.
2004/0201702 A1     10/2004     White
2006/0226865 A1     10/2006     Gallarda et al.
2013/0202200 A1*     8/2013     Ribnick ............... G06K 9/6221
    382/160
2013/0258063 A1     10/2013     Lee et al.
2014/0301632 A1*     10/2014     Ikeda ................... G06T 7/0004
    382/152

OTHER PUBLICATIONS

Written Opinion dated Dec. 15, 2015 for International Patent Application No. PCT/IB2015/057882.

WIPO/IB, International Preliminary Report on Patentability dated Apr. 18, 2017 for PCT/IB2015/057882.

EPO, Extended European Search Report, dated May 3, 2018, re European Patent Application No. 15850839.0.

* cited by examiner

SYSTEM, APPARATUS AND METHOD FOR CONFIGURATION OF INDUSTRIAL VISION CONTROL MODULES

CROSS-REFERENCE TO RELATED APPLICATION

This application claims priority from U.S. Provisional Patent Application No. 62/063,555, filed Oct. 14, 2014, the contents of which is incorporated herein by reference.

FIELD

The specification relates generally to configuration of industrial vision systems, and more specifically to a method and system for configuring industrial vision systems through a process of comparative analysis of output samples.

BACKGROUND

Setup and configuration of conventional industrial vision systems requires knowledge of operational settings for a large number of complex control parameters to optimize the camera and processing module in use. These parameters are generally set manually by an operator with in depth knowledge of the parameter settings for the specific vision system used in the industrial setting. These parameters control various aspects of the vision system such as contrast, focus, edge detection, shape detection, pattern matching, etc.

SUMMARY

According to aspects of the specification, systems and methods are provided to allow simplified configuration of vision systems (such as thermal cameras) by comparison of multiple visual output samples and related data, allowing the system to devise an ideal configuration based on categorization of the collected samples.

The system can refine its own configuration and logic through successive iterations of validation of automatically categorized samples (samples automatically categorized against a known base sample).

BRIEF DESCRIPTIONS OF THE DRAWINGS

Embodiments are described with reference to the following figures, in which.

DETAILED DESCRIPTION OF THE EMBODIMENTS

Figure 1:
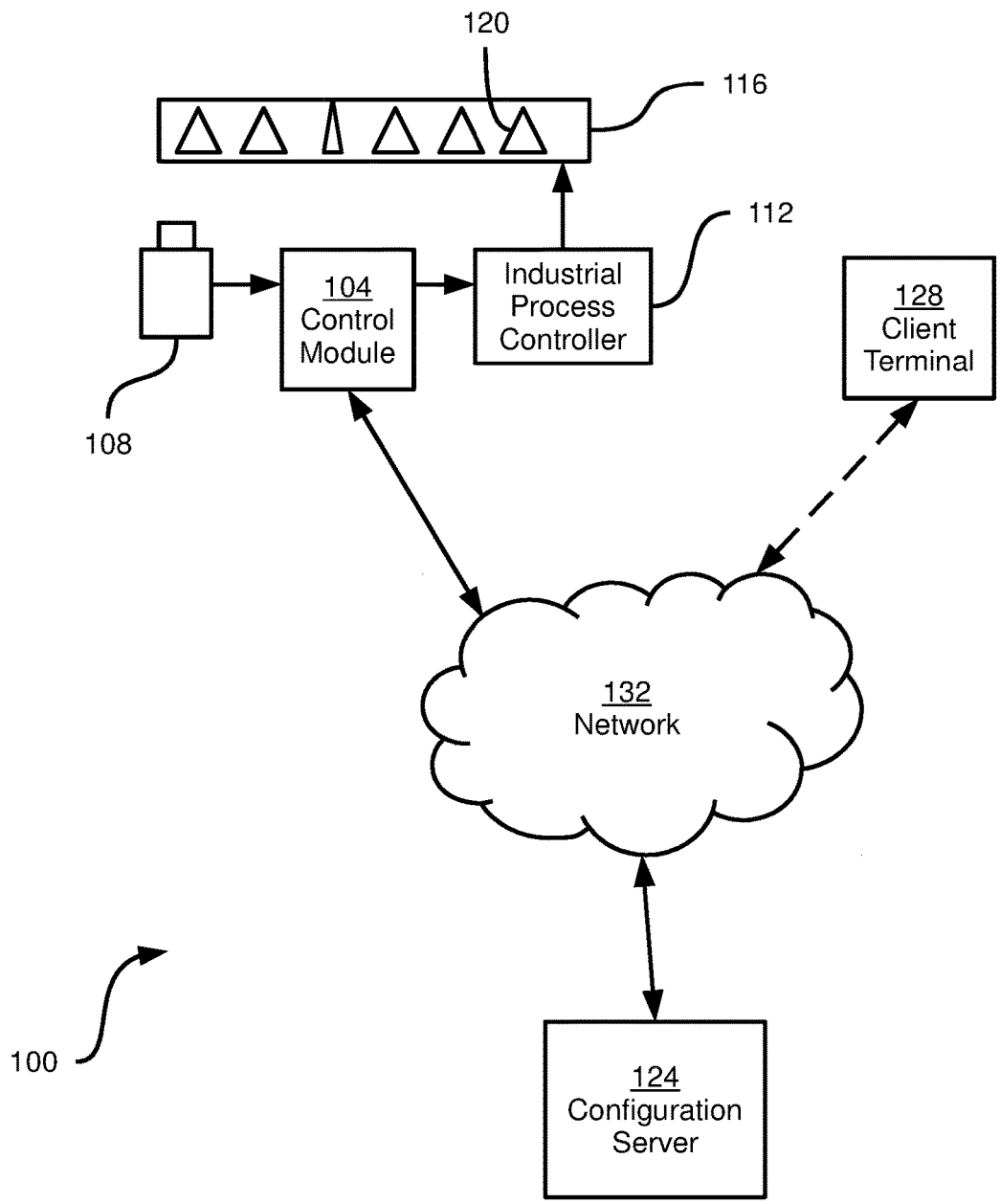
FIG. 1 depicts a system for configuring an industrial vision control module, according to a non-limiting embodiment.

FIG. 1 depicts a system 100 for configuring an industrial vision control module 104. System 100 includes the industrial vision control module 104, also referred to herein as control module 104. Control module 104 receives image data from an imaging device 108, either via a direct communications link (e.g. a Universal Serial Bus, USB connection or a Bluetooth™ connection), or via a network (e.g. via a wireless access point, router or other networking device), examples of which will be discussed below. Imaging device 108 can be any one of, or any suitable combination of optical cameras (i.e. capturing visible light), thermal cameras (i.e. capturing near-infrared and infrared radiation) and the like. More than one imaging device 108 can be provided in some embodiments. An examples of imaging device 108 is a thermal camera manufactured by FLIR®.

Control module 104 generally comprises a computing device (e.g. having one or more integrated circuits such as a central processing unit, a memory and the like) executing a control application. Control module 104 is configured, based on the image data received from imaging device 108, to generate control instructions and transmit (via either a direct connection or a network) the control instructions to an industrial process controller 112. Industrial process controller 112, in turn, acts on instructions received from control module 104 to control industrial equipment, such as a conveyor belt 116 or other equipment carrying manufactured products or subcomponents 120. For example, process controller 112, which can be any one of a programmable logic controller (PLC), laptop computer, desktop computer or the like, can control the speed of conveyor belt 116, and/or can control associated equipment (e.g. an air ejection device) to remove a defective one or a plurality of items 120 travelling along conveyor belt 116. As will now be apparent to those skilled in the art, in the present embodiment, imaging device 108 is configured to capture (and provide to control module 104) image data depicting the equipment controlled by process controller 112. For example, imaging device 108 can be configured to collect a series of images (including, but not limited to, a video stream) of items 120 travelling along conveyor belt 116. Each image may depict one item 120.

A wide variety of suitable conventional imaging devices 108, control modules 104, and industrial process controllers 112 and industrial process equipment will now occur to those skilled in the art.

System 100 also includes a configuration server 124 (also referred to herein as server 124) and a client terminal 128 interconnected with each other and with control module 104 via a network 132. Server 124 can be based on any suitable server computing environment; examples of certain internal components of server 124 will be discussed below. Client terminal 128 can be based on any of a variety of computing environments, including a desktop computer, a laptop computer, a tablet computer, a smart phone and the like. In some embodiments, the link between client terminal 128 and network 132 can be wireless (as shown in FIG. 1). The links between other components of system 100 can also be either wired or wireless, or a combination of wired and wireless.

Network 132 can be the same network as mentioned above (interconnecting imaging device 108 and control module 104), or an additional network. Network 132 can include any one of, or any combination of, a local area network (LAN) defined by one or more routers, switches, wireless access points or the like. Network 132 can also include any suitable wide area network (WAN), including cellular networks and the Internet.

In brief, before analyzing image data and issuing control instructions to controller 112, control module 104 is configured. Configuration of control module 104 involves the storage, at control module 104, of image attributes to be detected in the image data received from imaging device 108 and corresponding control instructions to be issued when such image attributes are present in the image data. As will be discussed in greater detail below, server 124 and client terminal 128 interact with each other and with control module 104 to collect and classify image data, derive configuration parameters and deploy the configuration parameters to control module 104.

Before discussing the configuration procedures performed by server 124 and client terminal 128 in detail, a brief description of internal components of server 124 and client terminal 128 will be provided.

Figure 2:
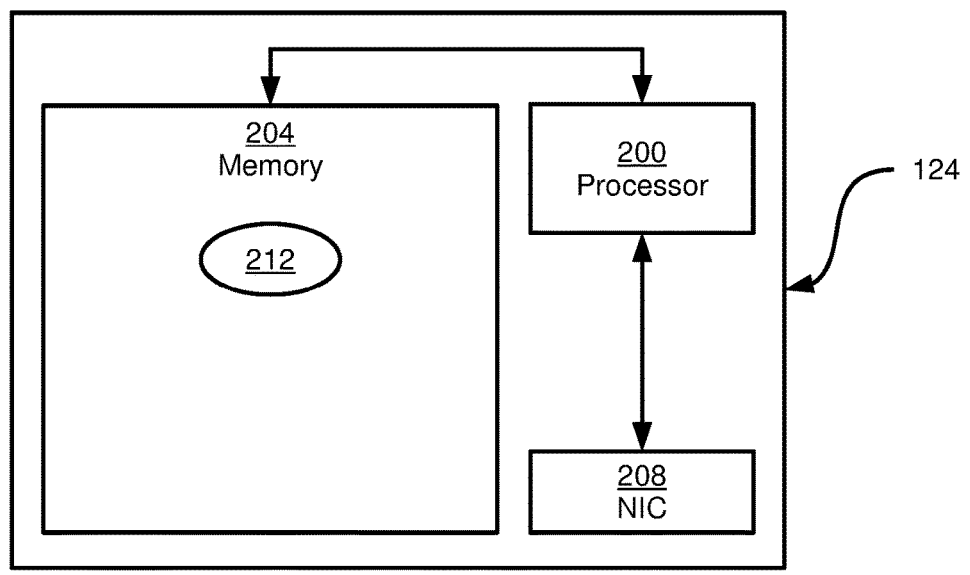
FIG. 2 depicts certain internal components of the server and the client terminal of the system of FIG. 1, according to a non-limiting embodiment.
Figure 2:
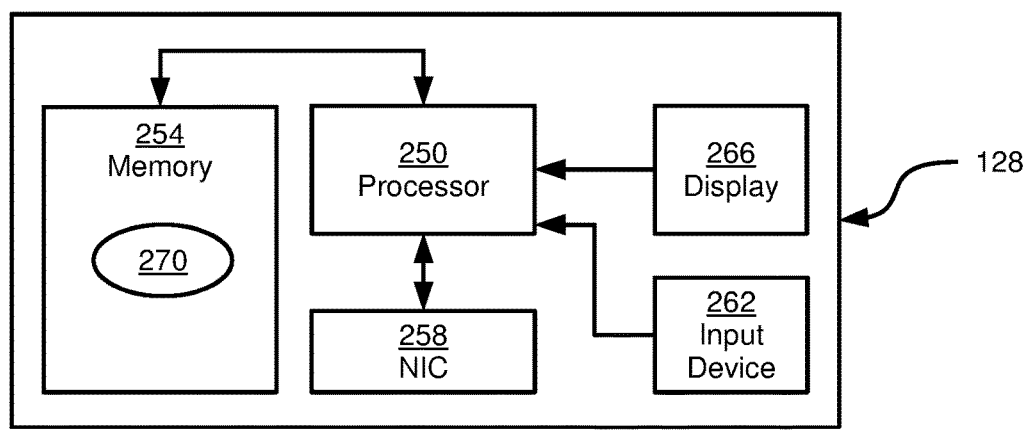

Referring to FIG. 2, server 124 includes a central processing unit (CPU) 200, also referred to herein as a processor 200, interconnected with a memory 204. Processor 200 and memory 204 are generally comprised of one or more integrated circuits (ICs), and can have a variety of structures, as will now occur to those skilled in the art (for example, more than one CPU can be provided).

Memory 204 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. In the present example, memory 204 includes both volatile and non-volatile storage.

Processor 200 is also interconnected with one or more network interfaces, such as a network interface controller (NIC) 208, which allows server 124 to connect to other computing devices, such as control module 104 and client terminal 128 via network 132. NIC 208 thus includes the necessary hardware to communicate via network 132. Server 124 can also include input devices (not shown) interconnected with processor 200, such as a keyboard and mouse, as well as output devices (not shown) interconnected with processor 200, such as a display. In some embodiments, the input and output devices can be connected to processor 200 via NIC 208 and another computing device. In other words, input and output devices can be local to server 124, or remote.

Memory 204 stores a plurality of computer-readable programming instructions, executable by processor 200, in the form of various applications, and also stores various types of data for use during the execution of those applications. As will be understood by those skilled in the art, processor 200 can execute the instructions of or more such applications in order to perform various actions defined within the instructions. In the description below, processor 200 or server 124 are said to be "configured to" perform certain functions. It will be understood that server 124 is so configured via the execution of the instructions of the applications stored in memory 204 by processor 200. Among the applications stored in memory 204 is a configuration application 212, which is executable by processor 200 to perform various actions described herein.

Client terminal 128 includes a central processing unit (CPU) 250, also referred to herein as a processor 250, interconnected with a memory 254. Processor 250 and memory 254 are generally comprised of one or more integrated circuits (ICs), and can have a variety of structures, as will now occur to those skilled in the art (for example, more than one CPU can be provided).

Memory 254 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. In the present example, memory 254 includes both volatile and non-volatile storage.

Processor 250 is also interconnected with one or more network interfaces, such as a network interface controller (NIC) 258, which allows client terminal 128 to connect to other computing devices, such as server 124 via network 132. NIC 258 thus includes the necessary hardware (e.g. a WiFi radio) to communicate via network 132.

Client terminal 128 can also include an input device 262 interconnected with processor 250, such as any one of, or any suitable combination of, a keyboard, a mouse, a touch screen integrated with a display, a microphone, and the like. Client terminal 128 also includes an output device interconnected with processor 250, such as a display 266. Display 266 can include any suitable display panel or combination of display panels. In some embodiments, display 266 can be integrated with input device 262 (e.g. when input device 262 includes a touch screen).

Memory 254 stores a plurality of computer-readable programming instructions, executable by processor 250, in the form of various applications, and also stores various types of data for use during the execution of those applications. As will be understood by those skilled in the art, processor 250 can execute the instructions of or more such applications in order to perform various actions defined within the instructions. Processor 250 or client terminal 128 are therefore said to be "configured to" perform certain functions, via the execution of the instructions of the applications stored in memory 254 by processor 250. Among the applications stored in memory 254 is a client configuration application 270, which is executable by processor 200 to perform various actions described herein.

Figure 3:
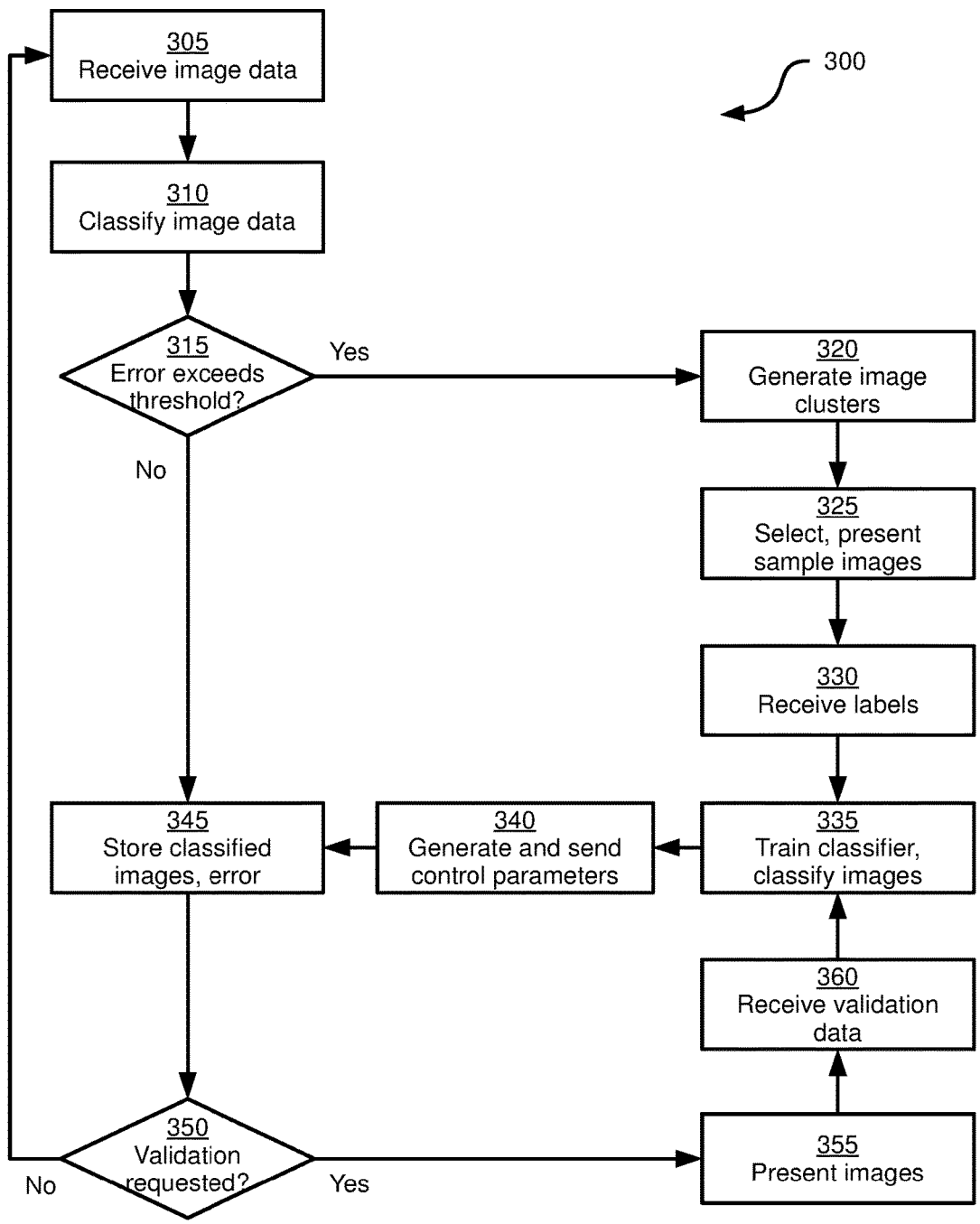
FIG. 3 depicts a method of configuring an industrial vision control module, according to a non-limiting embodiment.

Referring now to FIG. 3, a method 300 of configuring an industrial vision control module, such as control module 104. Method 300 will be described in conjunction with its performance in system 100, although it is contemplated that method 300 can also be performed by other suitable systems. In particular, the blocks of method 300 are performed by server 124, via the execution of application 212 and various interactions with control module 104 and client terminal 128.

At block 305, server 124 is configured to receive image data from control module 104, for example via network 132. The image data received at block 305 includes any one of, or any suitable combination of, a stream of video data, a video file, a plurality of still images, and the like, captured by imaging device 108 under the control of control module 104. Upon receipt of the image data, server 124 is configured to store the image data in memory 204 for further processing.

At block 310, server 124 is configured to classify the image data received at block 305. In brief, classification of image data includes determining which of a plurality of predefined classes corresponds to the image data. For example, when the image data includes a plurality of still images captured by imaging device 108, the classification at block 310 includes a determination, for each of the images, which of a plurality of classes best fits the image. In brief, each class corresponds to a set of image attributes, and images having the same class have those attributes in common and may therefore, for example, depict similar objects. A variety of classification techniques can be applied at block 310 by server 124, as will be discussed in greater detail below.

At block 315, server 124 is configured to determine whether an error metric associated with the classification at block 310 exceeds a predefined threshold. Various classification techniques include the generation of a measurement of confidence in the classification of each image (i.e. likelihood that the classification is incorrect). Server 124 is configured at block 315 to compare such error measurements to a threshold. When the determination at block 315 is affirmative (indicating that the classification is likely to be erroneous), the performance of method 300 proceeds to block 320.

In the present embodiment, it is assumed that control module has not yet been configured, and that no image classes have been created. Thus, the performance of blocks 310 and 315 may be omitted entirely, or a set of default classes can be employed for the first performance of block 310 which result in an affirmative determination at block 315. In any event, at block 320 server 124 is configured to generate one or more clusters, or groups, of images from the image data received at block 305. The performance of blocks 310 and 315 can be repeated for each received image, and server 124 can be configured to wait until a predefined number of affirmative determinations occur at block 315 to perform block 320, rather than performing block 320 immediately upon a single affirmative determination.

At block 320, server 124 is configured to execute any suitable clustering (also referred to as unsupervised learning) process on the subset of image data for which classification error exceeded the above-mentioned threshold. A variety of clustering processes that will occur to those skilled in the art can be applied at block 320. In general, server 124 is configured to analyze each image in the subset of image data for which block 320 is being performed, to generate at least one preconfigured image attribute. For example, server 124 can be configured to generate, for each image in the subset, a histogram (e.g. intensity, red, green, blue, and the like), an image moment, feature descriptors such as contours, edges, corners and patterns, and the like. Server 124 is then configured to group images having similar combinations of image attributes together. For example, in an implementation of k-means clustering, server 124 can be configured to define (e.g. at random) a plurality of cluster centroids, each centroid defined by a value for each of the above-mentioned image attributes. In other words, for n image attributes, each cluster centroid is a point in n-dimensional space. Server 124 is then configured to place each image in the cluster whose centroid is closest to the n-dimensional point defined by the image attributes of that particular image. Following the initial placement of images in the randomly-defined clusters, server 124 is configured to compute new centroids for each cluster as the averages of all the image points. The above process is repeated until the cluster centroids remain fixed, or substantially fixed.

Figure 4:
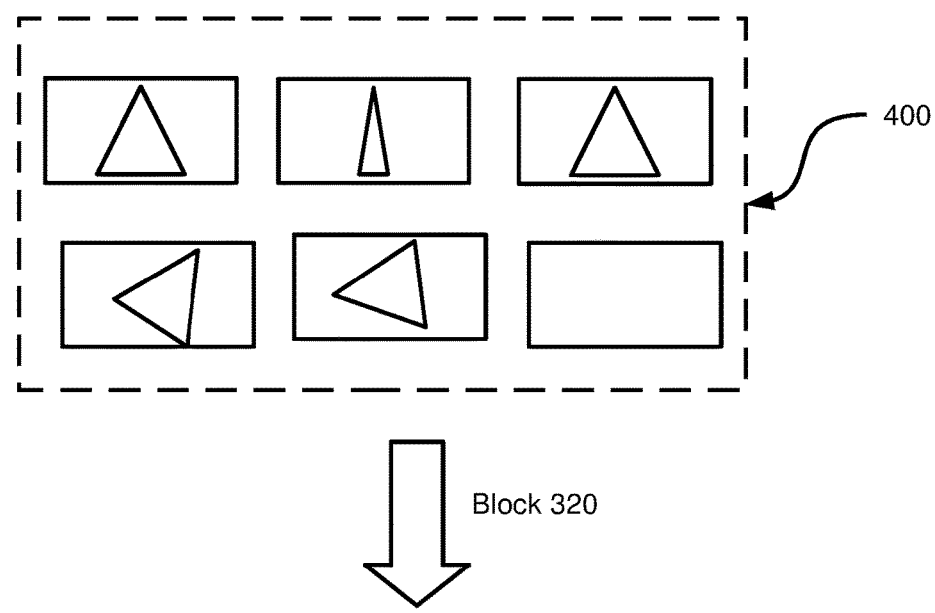
FIG. 4 depicts example image data received and processed during the performance of the method of FIG. 3, according to a non-limiting embodiment.
Figure 4:
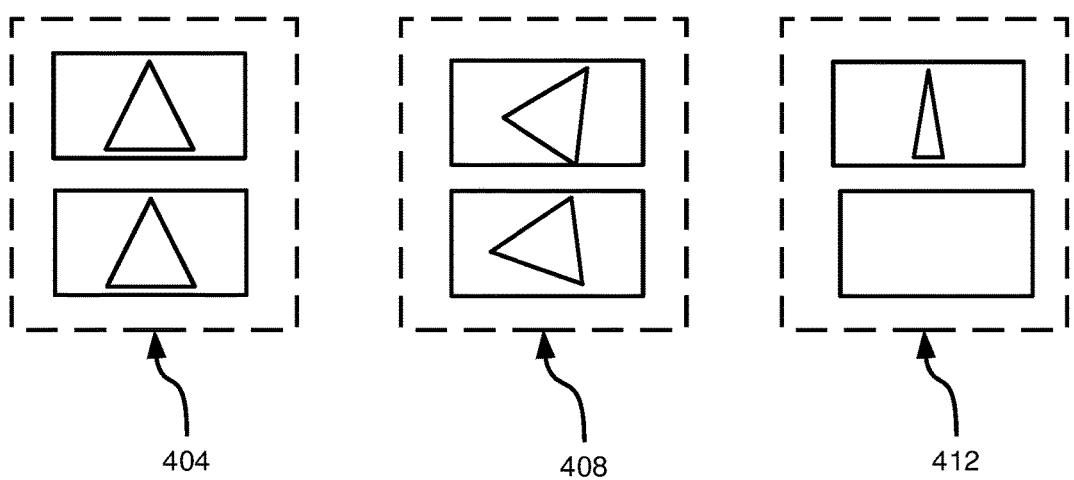

At block 320, for example, a set of one hundred images that could not be accurately classified at block 310 (whether the images comprise frames of a video stream, or individual still images), server 124 may subdivide the images into groups of less than one hundred based on similarities between the images. Turning to FIG. 4, an example of input image data received at block 305 is shown in the form of a set of images 400.

In the present example, it is assumed that in the first performance of method 300, blocks 310 and 315 are skipped, and the performance of method 300 proceeds directly to block 320. At block 320, server 124 divides the input images 400 into three clusters 404, 408 and 412. It is contemplated that although clusters 404, 408 and 412 are shown as having the same number of member images, in other performances of method 300 any number of images can appear in any cluster. As seen in FIG. 4, the images of each cluster 404, 408 and 412 bear certain resemblances.

Returning to FIG. 3, responsive to generating one or more clusters of images from the image data received at block 305 (or, more specifically, from the image data that was not successfully classified at block 310), at block 325 server 124 is configured to select at least one sample image from each cluster and present the sample images. Which images are selected as samples can be performed in a variety of ways. For example, server 124 can be configured to select an image from each cluster whose image attributes (e.g. whose point in n-dimensioned space defined by the image attributes mentioned above) is closest to the centroid of the respective cluster. In another example, server 124 can select a sample image at random from each cluster. In a further example, server 124 is configured to select a plurality of sample images from each cluster. For example, the closest image to the cluster centroid, and the furthest image from the cluster centroid can both be selected for presentation. In other words, the sample images can include both the image that deviates least from the average of the images in the cluster, and the image that deviates most from the average of the images in the cluster.

Presentation of the sample images at block 325 can be achieved in a variety of ways. For example, server 124 can present the sample images on a display connected directly to processor 200. In other embodiments, including the present embodiment, presentation of the sample images includes transmitting the sample images to client terminal 128, which in turn is configured (via execution of application 270) to present the sample images on display 266.

Figure 5:
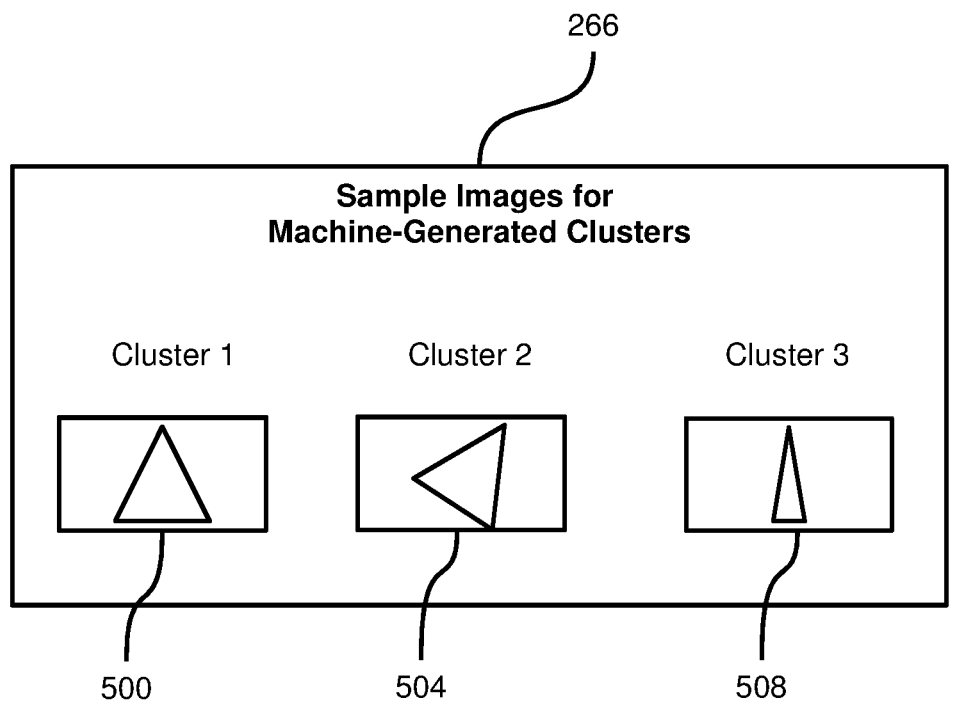
FIG. 5 depicts an interface presented by the client terminal of FIG. 1 during the performance of the method of FIG. 3, according to a non-limiting embodiment.

Turning to FIG. 5, an example of the results of the performance of block 325 is shown. In particular, display 266 of client terminal 128 is depicted, presenting one representative image from each cluster 404, 408 and 412. Specifically, sample image 500 corresponds to cluster 404, sample image 504 corresponds to cluster 408, and sample image 508 corresponds to cluster 412. As mentioned above, the sample images were received from server 124, for example over network 132. In some embodiments, server 124 is configured to transmit the sample images to client terminal 128 in response to a request from client terminal 128, while in other embodiments, server 124 is configured to send the sample images without a request.

Referring again to FIG. 3, at block 330 server 124 is configured to received input data defining one or more labels corresponding to each of the sample images. The input data is generally received from the same computing device as the sample images were transmitted to. Thus, in the present example, the input data is received at server 124 from client terminal 128. Client terminal 128 is configured to render the sample images 500, 504 and 508 as selectable elements on display 266. Upon selection of a sample image, client terminal 128 is configured to present a prompt for the creation of a new label, or the selection of one or more existing labels (that is, previously created in an earlier performance of method 300).

Figure 6:
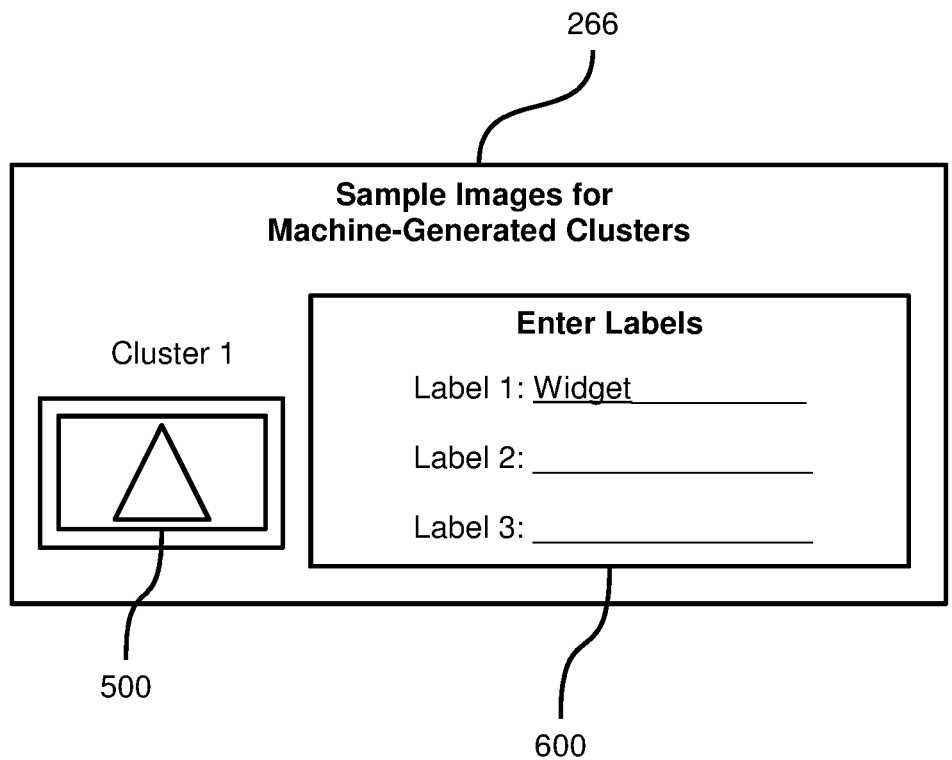
FIG. 6 depicts a further interface presented by the client terminal of FIG. 1 during the performance of the method of FIG. 3, according to a non-limiting embodiment.

Referring to FIG. 6, an updated interface is shown rendered on display 266, responsive to a selection of sample image 500 being made (e.g. via input device 262). Interface 600 includes a plurality of selectable prompts for receiving input data defining labels associated with the selected sample image. A first label, "widget", has been entered in one of the prompts, for example via input data received at input device 262. Upon receipt of the input data, client terminal 128 is configured to transmit the label, along with an identifier of the associated sample image, to server 124. Although three prompts are shown in FIG. 6, fewer or more prompts can be provided in other embodiments. Additionally, in subsequent performances of method 300, previously created labels can be selected, e.g. from drop-down menus in interface 600.

In some embodiments, labels can also be received for images beyond those selected as sample images. For example, client terminal 128 can be configured to render a selectable button or other element on display 266 that, when selected, causes client terminal 128 to request additional images from the cluster corresponding to a given sample images. Server 124 is configured to transmit the additional images to client terminal 128 in response to the request, and client terminal 128 can display the additional images (up to and including every image in a given cluster), and receive labels for each additional image.

Figure 7:
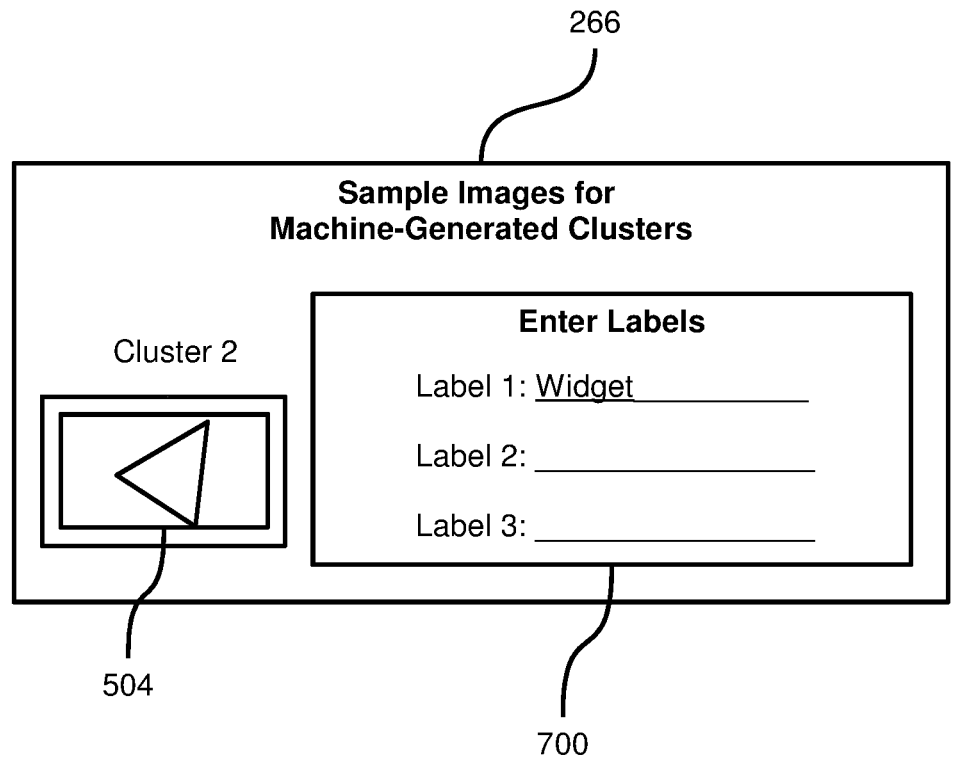
FIG. 7 depicts a further interface presented by the client terminal of FIG. 1 during the performance of the method of FIG. 3, according to a non-limiting embodiment.
Figure 8:
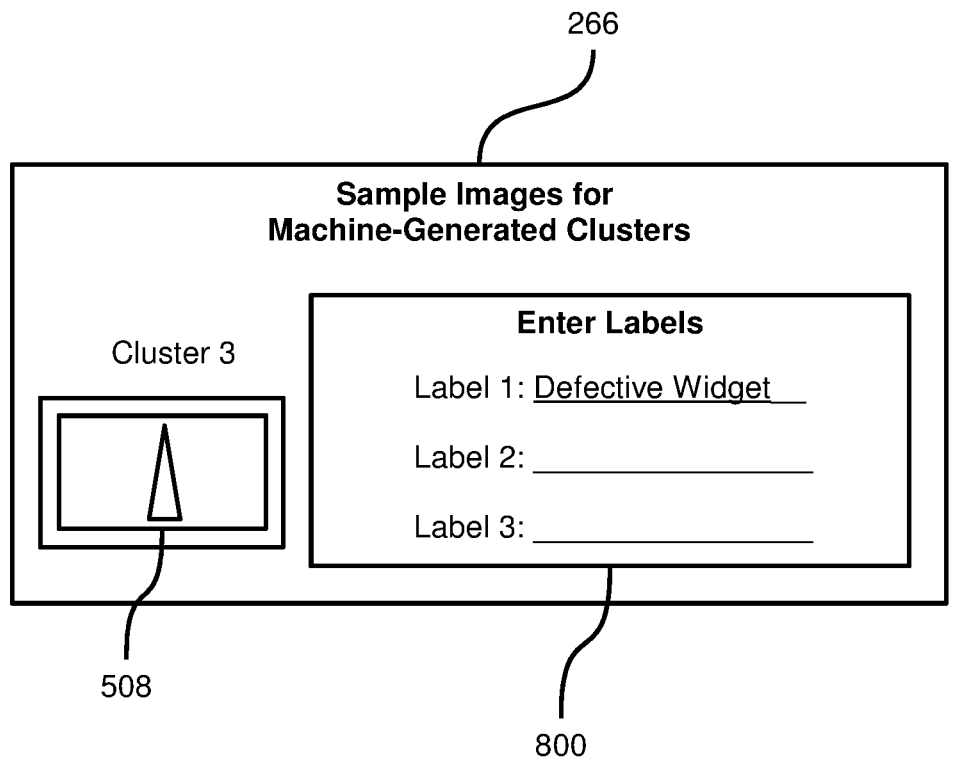
FIG. 8 depicts a further interface presented by the client terminal of FIG. 1 during the performance of the method of FIG. 3, according to a non-limiting embodiment.

FIGS. 7 and 8 illustrate additional interfaces 700 and 800, respectively, for use in labelling sample images 504 and 508, respectively. It is contemplated that in some embodiments, labelling interfaces such as interfaces 600, 700 and 800 can allow for certain image-editing functions, such as cropping an image to replace the image with a portion of the original image, prior to labelling the cropped portion.

As illustrated by FIGS. 7 and 8, it is also contemplated that sample images from different clusters can be assigned the same label. In other words, clusters 404 and 408 are effectively combined by labelling their sample images in the same way.

Having received label data for the sample images (and in some embodiments, for additional images in the clusters represented by the sample images), server 124 is configured to perform block 335. Server 124 is configured, in the present embodiment, to wait until label data has been received at least for every sample image presented at block 325 before performing block 335. However, in other embodiments, server 124 need not wait for all label data to be received.

At block 335, server 124 is configured to execute a classification training process to generate classification parameters, based on the image parameters discussed earlier and the labels received at block 330. In other words, while the clustering performed at block 320 is an example of an unsupervised learning process, the generation of classification parameters at block 335 is referred to as a supervised learning process, due to the availability of labels associated with the images.

A variety of classification processes can be executed at block 335 to generate classification parameters. In general, server 124 is configured to identify a set of image parameters that, when applied to the labelled images, successfully divides the labelled images into groups according to their labels. For example, server 124 can be configured to plot the image attributes (e.g. histograms and the like) mentioned earlier in n-dimensional space (or higher dimensions, in some classification techniques), such that each labelled image is assigned to one point in n-dimensional space. Server 124 can then be configured to identify one or more geometric structures (e.g. lines, planes, hyperplanes and the like) that correctly divide a group of points having one label from all other points. This method of classification is referred to as a support vector machine (SVM). A variety of other classification techniques can also be applied at block 335.

Prior to generating the classification parameters, server 124 is configured to apply the labels received at block 330 to all images in the clusters corresponding to those labels. For example, when the label "widget" is received in connection with sample image 500 (via interface 600), server 124 is configured to apply the same label to the other image in cluster 404 (that is, to store both images in cluster 404 in memory in association with the label "widget"), even though no labels were received directly corresponding to the other image of cluster 404.

Responsive to generating classification parameters at block 335, server 124 is configured to perform block 340. At block 340, server 124 is configured to generate and deploy control parameters to control module 104, based on the classification parameters generated at block 335. In other words, server 124 is configured to convert the classification parameters into alert conditions, image attribute ranges, or other parameters that control module 104 is capable of using to classify images received from imaging device 108.

The generation of control parameters at block 340 includes retrieving, from memory 204, an identifier of one or more formats of control parameters that control module 104 is configured to use. Server 124 can also retrieve from memory 204 one or more conversion rules. The conversion rules instruct server 124 on how to convert the classification parameters into control parameters. For example, server 124 can be configured at block 340 to convert the above-mentioned n-dimensional geometric structures into n pairs of values. Each pair of values defines an upper boundary and a lower boundary for one image attribute. The control parameters generated at block 340 include, for each label, the complete set of n boundary pairs, such that control module 104 is configured to assign the relevant label to an image whose attributes fall within each respective boundary pair. In other embodiments, control module 104 may be capable of implementing the same classification technique as employed by server 124, and thus no conversion may be necessary.

Thus, the control parameters generated at block 340 identify, for each of a plurality of labels, a set of image attributes corresponding to that label. The control parameters generated at block 340 also include a control action corresponding to each set of image attributes. The control action represents the control instruction to be sent to process controller 112 by control module 104 in response to detection of the corresponding set of image attributes. For example, when control module 104 detects the set of image attributes corresponding to the "defective widget" label (see FIG. 8), control module 104 can be configured to transmit a control instruction to process controller 112 to activate an air ejector to remove a defective one of the items 120 from conveyor belt 116.

Responsive to generating the control parameters, server 124 is configured to transmit the control parameters to control module 104, for example via network 132. Following the receipt of the control parameters, control module 104 can receive image data from imaging device, and generate control instructions to control equipment such as conveyor belt 116 by comparing the image data to the control parameters. Control module 104 is also configured to continue to send the image data to server 124.

Following the performance of block 340, at block 345 server 124 is configured to store the classified images and their associated error metrics in memory 204. At block 350, server 124 is configured to determine whether validation of the image classifications has been requested. When the determination is negative, server 124 returns to block 305 to receive additional image data and repeat the performance of method 300.

The determination at block 350 can be made based on input data received by server 124, and can also be made automatically by server 124. For example, in some embodiments, server 124 can automatically initiate validation for any images whose classification error metrics are above a certain threshold (which can be lower than the threshold applied at block 315). In other embodiments, server 124 can receive a validation request from client terminal.

Upon a positive determination at block 350, server 124 proceeds to block 355. At block 355, server 124 presents a selection of images stored at block 345 for validation. For example, server 124 can transmit to client terminal 128 any images with elevated classification error as mentioned above (that is, with low classification confidence or reliability). Client terminal 128 can then be configured to present those images on display 266 along with the labels assigned by server 124 via classification (either at block 335 or block 310).

At block 360, server 124 is configured to receive validation data either confirming that the labels assigned at block 310 or 335 are correct, or indicating that those labels are not correct. The validation data can also include new labels to replace the originally assigned labels. Having received the validation data, server 124 is configured to repeat the performance of block 335 to generate updated classification parameters. Those classification parameters are, in turn, converted to updated control parameters, which are deployed to control module 104 as mentioned above.

Thus, the performance of method 300 can continue in parallel with the control of industrial process equipment by control module 104, in order to refine the control parameters applied by control module 104.

Those skilled in the art will appreciate that in some embodiments, the functionality of either or both of client terminal 128 and server 124 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

We claim:

1. A server comprising:
a memory;
a network interface connecting the server with a vision control module coupled to a process controller controlling production equipment for manipulating items; and
a processor interconnected with the memory and the network interface, the processor configured to:
receive, via the network interface, image data depicting the items from the vision control module;
determine at least one attribute of the image data;
store at least one label in association with the at least one attribute; and
transmit control parameters to the vision control module based on the at least one label and the at least one attribute; the control parameters including (i) classification parameters defining the at least one attribute, and (ii) a control action for execution at the process controller responsive to detection of the at least one attribute by the vision control module according to the classification parameters; the control action defining a manipulation of the items performed by the process controller.

2. The server of claim 1, the processor further configured to store the at least one label by comparing the at least one attribute to previous attributes stored in the memory in association with labels.

3. The server of claim 1, the processor further configured, prior to transmitting the control parameters to the vision control module, to transmit the image data and at least one label to a terminal via the network interface.

4. The server of claim 3, the processor further configured to receive, via the network interface, input data from the terminal confirming or rejecting the association of the at least one label with the image data.

5. The server of claim 4, the processor further configured to receive, from the terminal, a further label; the processor further configured to store the further label in association with the at least one attribute.

6. The server of claim 5, the processor further configured to repeat the receipt of image data, the determination of at least one attribute, and the storage of at least one label.

7. A system, comprising:
the server of claim 1;
a vision control module connected to the server via a network;
an imaging device connected to the vision control module, the imaging device configured to provide the image data to the vision control module for transmission to the server; and
a process control apparatus connected to the vision control module, the vision control module configured to send control instructions to the process control apparatus based on the control parameters received from the server.

8. A method, comprising:
receiving, at a server, image data depicting items from a vision control module coupled to a process controller controlling production equipment for manipulating the items;
determining, at the server, at least one attribute of the image data;
storing at least one label at the server in association with the at least one attribute; and
transmitting control parameters from the server to the vision control module based on the at least one label and the at least one attribute; the control parameters including (i) classification parameters defining the at least one attribute, and (ii) a control action for execution at the process controller responsive to detection of the at least one attribute by the vision control module according to the classification parameters; the control action defining a manipulation of the items performed by the process controller.

9. The method of claim 8, the processor further configured to store the at least one label by comparing the at least one attribute to previous attributes stored in the memory in association with labels.

10. The method of claim 8, further comprising, prior to transmitting the control parameters to the vision control module, transmitting the image data and at least one label to a terminal via the network interface.

11. The method of claim 10, further comprising receiving, at the server, input data from the terminal confirming or rejecting the association of the at least one label with the image data.

12. The method of claim 11, further comprising receiving at the server, from the terminal, a further label; and storing the further label at the server in association with the at least one attribute.

13. The method of claim 12, further comprising repeating the receipt of image data, the determination of at least one attribute, and the storage of at least one label.

* * * * *